US012737175B1

(12) United States Patent
Cohen et al.

(10) Patent No.: US 12,737,175 B1
(45) Date of Patent: Sep. 15, 2026

(54) SYSTEMS AND METHODS FOR CORRELATING DEPLOYED SOFTWARE CONTAINERS TO SOURCE CODE USING CHART FINGERPRINTS

(71) Applicant: Wiz, Inc., New York, NY (US)

(72) Inventors: Ofir Cohen, Tel Aviv (IL); Eshel Yaron, Amsterdam (NL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/394,510

(22) Filed: Nov. 19, 2025

(51) Int. Cl.
*G06F 21/57* (2013.01)
*G06F 8/60* (2018.01)
*G06F 8/70* (2018.01)

(52) U.S. Cl.
CPC .................. *G06F 8/70* (2013.01); *G06F 8/60* (2013.01); *G06F 21/577* (2013.01); *G06F 2221/033* (2013.01)

(58) Field of Classification Search
CPC . G06F 8/70; G06F 8/60; G06F 21/577; G06F 2221/033; G06F 21/50; G06F 21/51; G06F 21/55; G06F 21/56; G06F 21/562; G06F 21/563; G06F 21/57
See application file for complete search history.

(56) References Cited

U.S. PATENT DOCUMENTS 10,649,749 B1 5/2020 Brooker et al.
11,494,493 B1 11/2022 Baird
2019/0020674 A1* 1/2019 Vervier ............... H04L 63/1408
2022/0164452 A1* 5/2022 Landman ............ G06F 16/9027
2023/0169170 A1 6/2023 Yaron et al.
2023/0315843 A1 10/2023 Yona et al.
2024/0427578 A1 12/2024 Kochura et al.
2025/0111035 A1* 4/2025 Knierim .................. G06F 21/56

OTHER PUBLICATIONS

"Charts." Helm Documentation, Helm, https://helm.sh/docs/topics/charts/. Accessed Apr. 15, 2026.

* cited by examiner

*Primary Examiner* — Malcolm Cribbs
(74) *Attorney, Agent, or Firm* — M&B IP Analysts, LLC

(57) ABSTRACT

A system and method for remediating software container cybersecurity issues at a source is presented. The method includes identifying a release record generated from a deployment platform; identifying a chart file based on the release record, the chart file including metadata and configuration parameters for deploying an application in a software container; generating a plurality of source code fingerprints based on metadata of a source code object; generating a fingerprint for the release record based on the metadata and the configuration parameters; matching the fingerprint for the release record to a first source code fingerprint from the plurality of source code fingerprints corresponding to a first source code object; detecting a cybersecurity issue in the software container; initiating a remediation action based on the cybersecurity issue on the first source code object, in response to the fingerprint of the first source code object matches the fingerprint for the release record.

19 Claims, 3 Drawing Sheets

SYSTEMS AND METHODS FOR CORRELATING DEPLOYED SOFTWARE CONTAINERS TO SOURCE CODE USING CHART FINGERPRINTS

TECHNICAL FIELD

This disclosure relates generally to cloud-native computing environments and, more particularly, to systems and methods for tracing deployed software containers to their originating chart files and source code repositories.

BACKGROUND

In modern cloud infrastructures, applications are often deployed to containerized environments using chart files. For example, Kubernetes is a containerized environment, and a Helm chart file is a chart file. Helm automates the packaging, configuration, and deployment of software containers by combining chart templates, configuration values, and metadata. However, once a Helm chart is deployed, the resulting runtime artifacts, such as Deployments, Pods, and Services, lose explicit traceability to their originating chart sources. This loss of provenance complicates debugging, auditing, and compliance verification.

Existing solutions rely on manual tagging or static annotations to relate deployed resources to source repositories. These techniques are error-prone and insufficient to handle frequent changes, branching, and version drift between runtime configurations and source code baselines. Furthermore, when security issues or misconfigurations are detected in a deployed container, determining which chart version or commit introduced the condition is non-trivial.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation causes or cause, the system to perform the actions. One or more computer programs can be configured to perform particular operations or actions by virtue of including instructions that, when executed by a data processing apparatus, cause the apparatus to perform the actions.

In one general aspect, the method may include identifying a release record generated from a deployment platform; identifying a chart file based on the release record, the chart file including metadata and a configuration parameters for deploying an application in a software container; generating a plurality of source code fingerprints, each source code fingerprint generated based on metadata of a source code object; generating a fingerprint for the release record based on at least the metadata and the configuration parameters; matching the fingerprint for the release record to a first source code fingerprint from the plurality of source code fingerprints corresponding to a first source code object; detecting a cybersecurity issue in the software container; and initiating a remediation action based on the cybersecurity issue on the first source code object, in response to determining that the fingerprint of the first source code object matches the fingerprint for the release record. Other embodiments of this aspect include corresponding computer systems, apparatus, and computer programs recorded on one or more computer storage devices, each configured to perform the actions of the methods.

Implementations may include one or more of the following features. The method may include: verifying a checksum of the chart file against a checksum in the release record.

The method where the metadata includes chart source metadata and version control metadata.

The method may include: hashing the metadata and configuration parameters.

The method may include: applying heuristic fingerprint matching based on the matched fingerprint for the release record to the first source code fingerprint, where the heuristic fingerprint matching is at least one of: nearest semantic version, commit timestamp proximity or checksum similarity.

The method may include: updating the chart file based on the first source code object. The method may include: storing the matched fingerprint for the release record to the first source code object in a central repository, where the central repository stores the matched fingerprint with a plurality of matched fingerprints, and performing compliance validation based on the plurality of matched fingerprints.

The method may include: detecting configuration drift based on the matched fingerprint for the release record to the first source code fingerprint.

The method may include: detecting a second chart file in the cloud computing environment, the second chart file including metadata and a configuration parameters for a deployed application in a software container. Implementations of the described techniques may include hardware, a method or process, or a computer tangible medium.

In one general aspect, the non-transitory computer-readable medium may include one or more instructions that, when executed by one or more processing circuitries of a device, cause the device to: identify a release record generated from a deployment platform; identify a chart file based on the release record, the chart file including metadata and a configuration parameters for deploying an application in a software container; generate a plurality of source code fingerprints, each source code fingerprint generated based on metadata of a source code object; generate a fingerprint for the release record based on at least the metadata and the configuration parameters; match the fingerprint for the release record to a first source code fingerprint from the plurality of source code fingerprints corresponding to a first source code object; detect a cybersecurity issue in the software container; initiate a remediation action based on the cybersecurity issue on the first source code object, in response to determining that the fingerprint of the first source code object matches the fingerprint for the release record. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: verify a checksum of the chart file against a checksum in the release record.

The system where the metadata includes chart source metadata and version control metadata.

The system where the memory contains further instructions which when executed by the processing circuitry further configure the system to: hash the metadata and configuration parameters.

The system where the memory contains further instructions which when executed by the processing circuitry further configure the system to: apply heuristic fingerprint matching based on the matched fingerprint for the release record to the first source code fingerprint, where the heuristic fingerprint matching is at least one of: nearest semantic version, commit timestamp proximity or checksum similarity.

The system where the memory contains further instructions which when executed by the processing circuitry further configure the system to: update the chart file based on the first source code object.

The system where the memory contains further instructions which when executed by the processing circuitry further configure the system to: store the matched fingerprint for the release record to the first source code object in a central repository, where the central repository stores the matched fingerprint with a plurality of matched fingerprints; and perform compliance validation based on the plurality of matched fingerprints.

The system where the memory contains further instructions which when executed by the processing circuitry further configure the system to: detect configuration drift based on the matched fingerprint for the release record to the first source code fingerprint.

The system where the memory contains further instructions which when executed by the processing circuitry further configure the system to: detect a second chart file in the cloud computing environment, the second chart file including metadata and a configuration parameters for a deployed application in a software container. Implementations of the described techniques may include hardware, a method or process, or a computer tangible medium.

In one general aspect, the system may include a processing circuitry. The system may also include a memory, the memory containing instructions that, when executed by the processing circuitry, configure the system to: identify a release record generated from a deployment platform; identify a chart file based on the release record, the chart file including metadata and a configuration parameters for deploying an application in a software container; generate a plurality of source code fingerprints, each source code fingerprint generated based on metadata of a source code object; generate a fingerprint for the release record based on at least the metadata and the configuration parameters; match the fingerprint for the release record to a first source code fingerprint from the plurality of source code fingerprints corresponding to a first source code object; detect a cybersecurity issue in the software container; initiate a remediation action based on the cybersecurity issue on the first source code object, in response to determining that the fingerprint of the first source code object matches the fingerprint for the release record. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
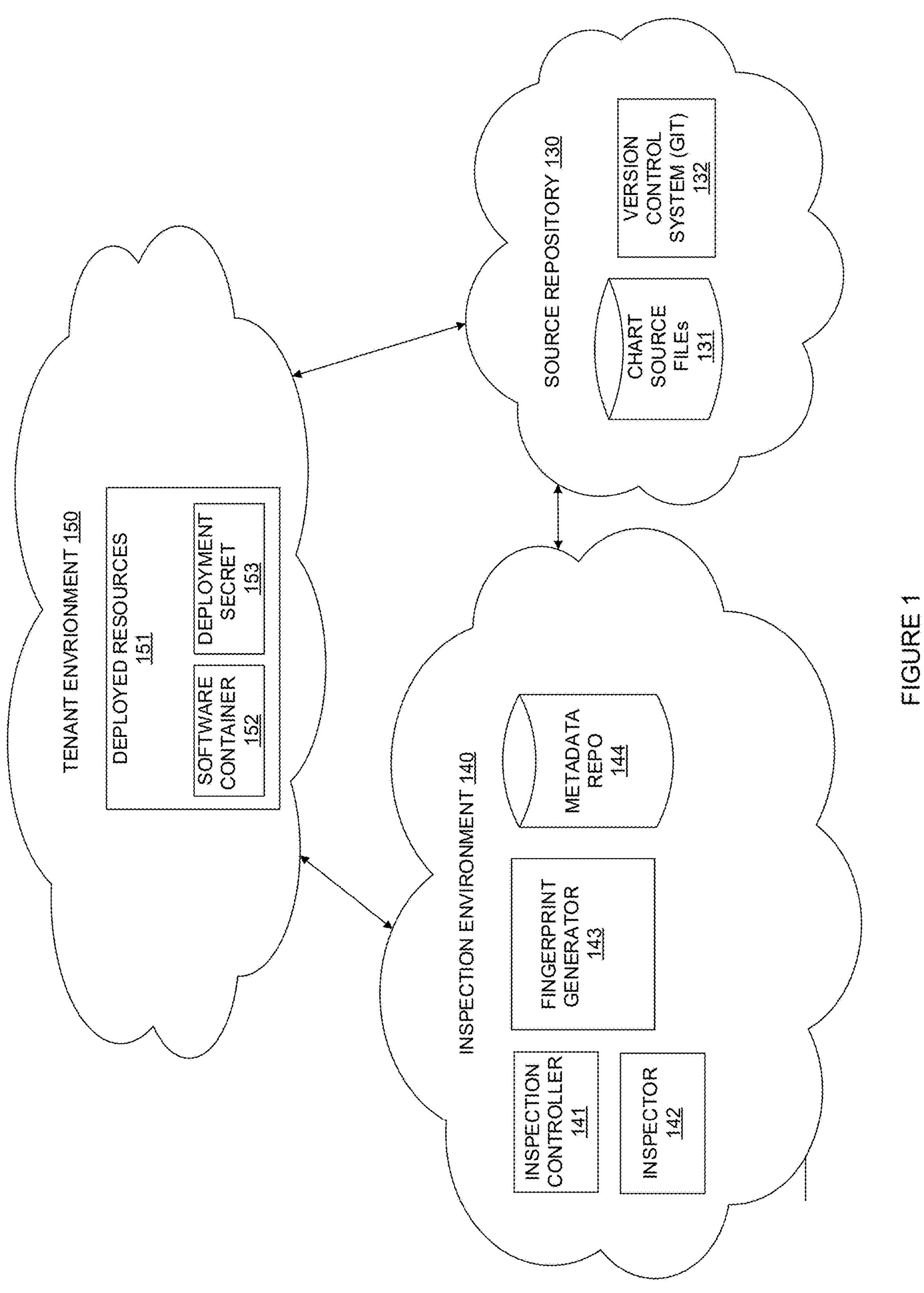
FIG. 1 illustrates an example system architecture including a source repository, an inspection environment and a tenant environment according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In some embodiments, a system described herein performs chart metadata collection from containerized environments to detect release records and associated configuration parameters. The system generates fingerprints for release records and source code objects maintained in version control repositories. These fingerprints are matched to identify equivalence or drift between deployed resources and their corresponding source versions.

In some embodiments, the system further detects cybersecurity issues in deployed software containers and initiates remediation actions based on correlated source code fingerprints. For example, responsive to detecting a vulnerable container image, the system identifies the Helm chart template and is responsible for the deployment, and issues an automated update or rollback.

In some embodiments, the system includes an inspection environment configured to communicate with one or more tenant environments. The inspection environment includes an inspection controller, an inspector, a fingerprint generator, and a metadata repository. The inspection controller orchestrates chart detection, fingerprint generation, and correlation workflows. The inspector retrieves chart metadata and deployed resource information from tenant environments. The fingerprint generator computes and compares fingerprints, while the metadata repository stores correlation records, drift reports, and remediation history.

By linking runtime artifacts back to their originating source repositories, the disclosed system provides continuous traceability, improves security response time, and enhances DevOps efficiency by unifying runtime analysis with source control context.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In some embodiments, the various disclosed embodiments include a method and system for mapping runtime deployment artifacts in a containerized environment to their originating source definitions. The method includes identifying a release record generated from deployment of a chart file, identifying the chart file based on the release record, and correlating the chart file to one or more source code objects stored in a version control repository. The system further includes components for generating fingerprints of the release record, chart file, and source code objects; matching the fingerprints to establish traceability; detecting security or configuration deviations in a deployed software container; and initiating mitigation or remediation actions based on the traceability results. In some embodiments, the disclosed method and system improve auditability, compliance validation, and security posture within DevOps and cloud-native workflows by providing end-to-end linkage from runtime artifacts to source-level definitions.

FIG. 1 illustrates an example system architecture including a source repository 130, an inspection environment 140, and a tenant environment 150 according to an embodiment.

While a single tenant environment 150 is discussed for simplicity, it is evident that certain embodiments include a plurality of tenant environments, variations thereof, a combination thereof and the like, without departing from the scope of this disclosure.

In some embodiments, the inspection controller 141 is configured to orchestrate the workflow of the inspection environment 140. The inspection controller 141 is configured to coordinate operations between the inspector 142, the fingerprint generator 143, the metadata repository 144, a combination thereof, and the like. For example, responsive to detection of a release record in tenant environment 150, the inspection controller 141 directs the inspector 142 to query the software container and retrieve release records from deployment (such as the deployed resources 151) on the deployment platform (such as tenant environment 150). In some embodiments, the inspection controller 141 further manages the initiation of a remediation action.

For example, the release record includes chart metadata and configuration parameters that describe a deployed workload in a software container. In some embodiments, the chart metadata and configuration parameters are based on a chart file. In some embodiments, the release record further serves as a source of truth for policy validation, fingerprint generation, drift detection, and remediation.

In some embodiments, the release record comprises identifiers such as chart name, version, release name, namespace, deployment timestamp, configuration values, and rendered resource templates.

In some embodiments, the release record is stored as a deployment secret or configuration map generated by a deployment management platform during installation or upgrade operations. The release record thereby provides a serialized snapshot of the deployment state of the chart file, which may be used by the inspection environment to reconstruct the chart-to-runtime mapping, generate fingerprints, and establish correspondence between deployed resources and their chart source files in the repository.

In some embodiments, the chart file is a source-level definition stored in a source repository, whereas the release record is a runtime artifact created by the deployment platform that encodes metadata and configuration derived from the chart file.

In some embodiments, the inspector 142 is a component configured to statically analyze a disk, a file, a filesystem, code, etc. An inspector is configured to detect a cybersecurity object, which in some embodiments indicates a cybersecurity risk/issue/misconfiguration/etc.

In some embodiments, the cybersecurity objects include a file, folder, binary, library, secret, cryptographic key, AI artifact, hash, signature, certificate, combinations thereof, and the like.

In some embodiments, the inspector 142 is configured to query the tenant environment 150 by issuing an application programming interface (API) call to identify the release record. For example, the inspector 142 issues an API call to a container orchestration API, such as to a Kubernetes API server, to identify Helm release records (e.g., Kubernetes Secrets or ConfigMaps) associated with deployed software containers. The inspector 142 retrieves metadata from source repository 130, including chart source metadata and version control metadata.

In some embodiments, the inspector 142 is configured to detect a release record in a cloud computing environment, such as a tenant environment 150. In some embodiments, the inspector 142 is configured to detect a chart file based on the release record by resolving chart identifiers and version information encoded in the release record to corresponding chart source files in a version control repository.

In some embodiments, a chart file includes metadata and configuration parameters. For example, a chart file includes metadata and configuration used by Helm to define and deploy in a software container. In some embodiments, the chart file metadata includes source metadata (e.g., Chart.yaml, values.yaml), and runtime metadata from the associated release record is linked with the chart record.

For example, the chart file is used by Helm to render concrete Kubernetes manifests and install, upgrade, or roll back application workloads in deployed resources 151.

In some embodiments, the chart file is a Helm chart source file.

In some embodiments, the chart file is identified based on a release record generated from the deployment platform. The release record encodes chart metadata, parameter values, and rendered resource templates. For example, the release record is a Kubernetes Secret (i.e., a deployment secret) or ConfigMap. In another example, the release record is generated by a deployment platform such as Kubernetes. In some embodiments, the inspector 142 is configured to identify a release record on a deployment platform by issuing an API call. In some embodiments, the inspector 142 is further configured to identify the chart In some embodiments, the chart file includes descriptive metadata such as chart name, version, configuration parameters such as container image identifiers, replica counts, storage settings, network policies, resource templates, a combination thereof, and the like, defining objects such as deployments, services, ingresses, ConfigMaps, a combination thereof, and the like.

In some embodiments, the deployed resources 151 include software container 152 and deployment secret 153.

In some embodiments, the software container 152 is an execution environment for running application workloads, such as a Docker container, Kubernetes Pod, container image, a combination thereof, and the like. In some embodiments, the software container comprises deployed resources including configuration parameters, container images, mounted volumes, exposed ports, and associated orchestration metadata. A release record deployed into a tenant environment 150 is used to define the configuration of the software container 152, and the software container 152 serves as the basis for detecting chart files, generating fingerprints, and performing compliance validation.

In some embodiments, detection of a chart file is based on a query to an API. For example, a query to the API includes detection of chart metadata, objects generated during installation, instantiation, deployment, a combination thereof, and the like. For example, the inspection environment queries a namespace for secret payloads in the deployment secret matching naming conventions such as Helm naming conventions (e.g., sh.helm.release.v1.payments.1).

In some embodiments, a query to an API identifies a deployment secret. In some embodiments, the inspector 142 is configured to query an API to identify the deployment secret. In some embodiments, the deployment secret is deployment secret 153. In some embodiments, the deployment secret 153 is an API object stored in the tenant environment 150 that encodes release information generated by Helm.

In some embodiments, the deployment secret (e.g., deployment secret 153) includes chart-related data such as chart name, version, release name, namespace, values checksums, and rendered container orchestration resource manifests (e.g., stored in a base64-encoded payload object). For example, Helm uses Secrets (i.e., the deployment secret), colloquially referred to as Helm Secret, to track installed releases, maintain revision history, and support rollback or upgrade operations.

In some embodiments, chart-related data is stored in a release field.

In some embodiments, the inspection environment 140 is configured to determine that a release record associated with a chart file was deployed in the tenant environment 150 based on the deployment secret.

In some embodiments, the chart file includes chart metadata and configuration parameters for deploying the software container (such as software container 152).

In some embodiments, chart metadata is stored in a deployment secret.

For example, chart metadata is stored in a deployment secret generated during release installation, upgrade, rollback, a combination thereof and the like. The deployment secret includes release-specific metadata such as release name (e.g., "payments"), namespace (e.g., "prod"), chart name (e.g., "payments-api"), chart version (e.g., "1.5.2"), deployment timestamp (e.g., "2024-03-14T16:21:00Z"), encoded templates, and values. For example, a Kubernetes deployment secret in a Helm chart file includes a base64-encoded payload object containing the chart version "1.5.2," a values.yaml checksum abcd1234, and rendered Kubernetes Deployment and Service manifests.

In some embodiments, the inspection environment 140 includes an inspector component configured to query an API, such as a Kubernetes API or other container orchestration API, of the tenant environment 150 to identify and retrieve Kubernetes Secrets containing chart metadata. For example, the inspector invokes kubectl get secrets-n prod-I owner=helm or programmatically calls the Kubernetes API using a client library to return Secret objects labeled with Helm ownership (e.g., owner=helm) or named according to Helm conventions (e.g., sh.helm.release.v1.<release>.<revision>).

In some embodiments, the inspector retrieves and decodes chart metadata for fingerprint generation. In some embodiments, the inspector stores the decoded chart metadata in the metadata repository 144.

In some embodiments, the chart metadata is decoded, parsed, normalized, a combination thereof, and the like. In some embodiments, the inspector 142 is configured to decode, parse, normalize, a combination thereof, and the like, the chart metadata.

In some embodiments, decoding includes base64-decoding encoded payload objects.

In some embodiments, parsing includes identifying fields such as chart name ("payments-api"), chart version ("1.5.2"), and values (e.g., resource limits, image tags), a combination thereof, and the like.

In some embodiments, normalization includes converting metadata into a canonical JSON representation with fields sorted deterministically, such as {chart: "payments-api", version: "1.5.2", valuesChecksum: "abcd1234"}.

In some embodiments, the chart metadata is linked with runtime artifacts, metadata, a combination thereof, and the like, such as ConfigMaps, persisted values files, Helm logs, a combination thereof and the like, from the associated release record. For example, the inspector 142 queries ConfigMaps with keys matching release-history, reads a persisted values.yaml file mounted in a chart directory, tail Helm client logs, a combination thereof, and the like, to extract chart names and versions.

In some embodiments, the inspector 142 is configured to decode, parse, normalize, a combination thereof and the like, the runtime artifacts.

In some embodiments, the collection of chart metadata for fingerprinting is performed after deployment of a Helm release, during deployment by intercepting the Helm workflow, periodically by scheduled scans, a combination thereof and the like.

In some embodiments, after deployment, the inspector 142 is configured to query a deployment secret, such as deployment secret 153. For example, the inspector queries the deployment secret by querying an API call. The inspector queries the deployment secret by querying an API call for secrets objects in the namespace of the release of the deployment secret.

In some embodiments, the inspector identifies a secret payload in the deployment secret, such as "sh.helm.release.v1.payments.1," that encodes the first revision of a release record (i.e., "payments"). The inspector retrieves the Secret payload in the deployment secret, which includes chart metadata such as chart name, chart version, release name, namespace, and an encoded values file checksum.

In some embodiments, the inspector 142 intercepts API calls (such as Helm API calls), hooks into, a combination thereof and the like, a CI/CD pipeline stage that runs "helm install." A periodic scan is executed within fixed intervals, for example, executed every hour to retrieve and refresh fingerprints for long-running clusters.

In some embodiments, the inspection environment 140 generates a plurality of source code fingerprints, each source code fingerprint generated based on metadata of a source code object. For example, the inspection environment computes fingerprints for every Helm chart stored under the charts/directory of a GitHub repository in version control system 132.

While a single source repository 130 is discussed, it is evident that certain embodiments include a plurality of repositories, variations thereof, a combination thereof and the like.

In some embodiments, a source code object includes a unit of source content maintained in a source repository 130.

For example, the source code object is a chart source files 131 (e.g., Chart.yaml, values.yaml, and files under templates). The chart source files 131 can include commit objects, tree objects, annotated tags, release artifacts, repository manifests, object hierarchy, a directory path, a filesystem path, a combination thereof and the like.

In some embodiments, source code objects are located in a source repository 130 that includes a version control system 132 (e.g., Git, GitHub, GitLab, Bitbucket, a combination thereof and the like). In some embodiments, the source repository 130 is hosted as a managed cloud service, an on-premises VCS server, or a self-hosted Git service within a private network. In some embodiments, the repository layout includes directories (e.g., charts/<chart-name>/) that contain the source code objects.

In some embodiments, the inspection environment 140 retrieves source code objects by communicating with the version control system 132 using authenticated APIs, repository protocols, a combination thereof and the like. For example, the inspection environment 140 performs: (i) a shallow clone over HTTPS or SSH to obtain specific paths and revisions; (ii) a provider API request (e.g., "get file contents at commit <hash>" or "download archive for tag <vX.Y.Z>"); or (iii) a raw content fetch for a given branch and path, a combination thereof and the like. In some embodiments, access is granted via read-only credentials, deploy keys, or OAuth tokens, and requests include repository URL, reference (branch, tag, or commit), and path selectors to identify the source code object.

In some embodiments, the metadata of a source code object includes version control metadata, chart source metadata, a combination thereof and the like.

In some embodiments, upon retrieval, the inspection environment 140 parses the source code object to extract version control metadata (e.g., commit hash, tag, branch), chart source metadata (e.g., chart name, version, dependencies, values parameters, and resource templates), a combination thereof and the like.

In some embodiments, the version control metadata includes repository tags (e.g., v1.2.3), branches (e.g., release/1.2), commit identifiers (e.g., 7f9e2c4), version annotations, a combination thereof and the like. In some embodiments, the version control metadata is stored in version control system 132. In some embodiments, each source code object is associated with version control metadata maintained by a version control system 132, such as commit identifiers, branches, tags, authorship, timestamps, version annotations, a combination thereof and the like.

In some embodiments, the chart source metadata includes Chart.yaml, values.yaml, template manifests (e.g., templates/deployment.yaml), a combination thereof and the like. In some embodiments, chart source metadata is stored in chart source files.

In some embodiments, inspection environment 140 includes metadata repository 144.

In some embodiments, inspection environment 140 is configured to store chart files, metadata associated with software containers, source chart files, metadata associated with source chart files, such as version control metadata and chart source metadata in a central repository (e.g., metadata repository 144).

In some embodiments, a plurality of source fingerprints is generated. In some embodiments, the inspection environment 140 generates the plurality of the source code fingerprints based on the metadata of the source code object.

In some embodiments, the inspection environment 140 further includes a fingerprint generator 143. Fingerprint generator 143 is configured to generate fingerprints from chart source files and version control metadata received from inspector 142, metadata repository 144, a combination thereof and the like.

In some embodiments, source code fingerprints are generated based on the chart source metadata. For example, the inspection environment computes a SHA-256 hash over the contents of Chart.yaml, a checksum over values.yaml, and hashes of each template file.

In some embodiments, source code fingerprints are generated based on the version control metadata. For example, a Git commit hash 7f9e2c4 is the fingerprint. In another example, a tag identifier v1.2.3 is recorded, and a branch pointer release/1.2 is normalized as the fingerprint.

In some embodiments, source code fingerprints are computed using cryptographic hashes, digests, structural identifiers, a combination thereof and the like.

In some embodiments, the fingerprint generator 143 generates a fingerprint for the release record.

In some embodiments, the fingerprint for the release record is generated based on the metadata, configuration parameters, a combination thereof and the like, of the release record.

For example, the fingerprint for the release record includes metadata such as a chart name "payments-api," version "1.5.2," release name "payments," namespace "prod," a checksum of values.yaml as decoded from the Secret, a combination thereof and the like.

For example, responsive to chart metadata indicating chart name "payments-api" and chart version "1.5.2," the inspection environment 140 generates the fingerprint for the release record represented as payments-api: 1.5.2:abcd1234.

In some embodiments, fingerprints for the release records are generated by computing a SHA-256 hash over a canonical JSON object containing fields {chart: "payments-api", version: "1.5.2", valuesChecksum: "abcd1234"}.

In some embodiments, the fingerprint generator 143 is configured to match the fingerprint of the release record against the plurality of source code fingerprints.

In some embodiments, matching the fingerprint of the release record against the plurality of source code fingerprints is based on a hash comparison. For example, a hash comparison includes matching the fingerprint against a database of source code fingerprints stored in version control system 132.

In some embodiments, the inspection environment associates the release record with a particular chart source object, repository identifier, a combination thereof and the like. For example, a repository URL is a repository identifier (https://github.com/org/repo), branch (release/1.2), commit hash (7f9e2c4), file path (charts/payments-api/Chart.yaml), a combination thereof and the like, based on the match.

For example, responsive to chart metadata indicating chart name "myapp" and chart version "1.2.3," the fingerprint generator 143 generates a release record fingerprint for "myapp: 1.2.3." In another example, the fingerprint generator 143 queries version control system 132, such as via inspector 142, and compares the release record fingerprint against the plurality of source code fingerprints derived from Chart.yaml and commit tags. Responsive to a match, the release record fingerprint is matched or correlated with the source code fingerprint, linking the runtime release to commit abcd1234 associated with tag v1.2.3 in version control system 132.

In some embodiments, matching the fingerprint of the release record with one of the source code objects in the plurality of source code objects is based on a checksum verification. For example, a checksum fingerprint abcd1234 of values.yaml decoded from the tenant environment 150 is compared against a checksum fingerprint abcd1234 of values.yaml stored in source repository 130. Responsive to a match, the inspection environment 140 establishes equivalence between runtime configuration and repository configuration.

In some embodiments, configuration drift is based on the matching of the fingerprint of the release record with the first source code object. For example, the release record of the fingerprint corresponding to version "1.2.3" while the latest source code fingerprint corresponds to "1.2.5," the inspection environment 140 determines that version drift exists.

In some embodiments, configuration drift is detected by comparing values.yaml in the fingerprint of the release record and rendered template in the first source code object. In some embodiments, the inspector is configured to detect configuration drift. For example, if the fingerprint of the release record includes values.yaml is abcd1234 while the source code fingerprint is efgh5678, the inspection environment determines configuration drift exists, notwithstanding equivalent version identifiers.

In some embodiments, heuristic fingerprint matching is applied where a direct match is unavailable. Heuristics include nearest semantic version (e.g., runtime 1.2.2 mapped to repository 1.2.3), commit timestamp proximity (runtime release on March 10, nearest commit dated March 9), checksum similarity (Hamming distance between digests), string similarity of resource names, fuzzy matching, a combination thereof and the like.

In some embodiments, chart file metadata, version control metadata, fingerprints for the release records, source code fingerprints, drift detection results, a combination thereof and the like, are stored in a central metadata repository. For example, stored data includes tenant environment identifiers (e.g., prod), repository identifiers (e.g., github.com/org/repo), and drift classifications (version drift, config drift).

In some embodiments, matching the fingerprint for the release record to a first source code object is classified as a mismatch. For example, if the system is unable to match the fingerprint for the release record to the plurality of source code objects based on hash comparison, chart file, chart source object, repository identifier, checksum verification, heuristic fingerprint matching, a combination thereof and the like, results in classifying the matched fingerprint for the release record to a first source code object is a mismatch.

In some embodiments, the results of matching the fingerprint for the release record to a first source code fingerprint from the plurality of source code fingerprints corresponding to a first source code object, correlation results, mismatching results, combination thereof and the like, are stored in a central repository (such as metadata repository 144).

In some embodiments, stored fingerprints and correlation results are used for compliance validation, security auditing, regression testing, governance reporting, DevOps debugging, automated remediation actions, a combination thereof and the like.

For example, the compliance validation includes a compliance report with a table for each tenant environment, the table including a fingerprint for the release record, source code fingerprint, and detected configuration drift. For example, compliance validation is comparing newly generated fingerprints for the release record against previously stored correlation records to confirm that prior matches remain valid following updates to chart source files or deployment configurations.

While mitigation and remediation are discussed separately for clarity, certain embodiments include both, variations thereof, a combination thereof and the like.

In some embodiments, the inspection environment 140 is configured to detect a cybersecurity issue in the software container. For example, the cybersecurity issue includes detection of container images with known CVEs (e.g., CVE-2023-12345), detection of an unauthorized open port 8080, presence of a misconfigured network policy allowing unrestricted ingress, missing encryption configuration for persistent volumes, a combination thereof and the like.

In some embodiments, detection is performed by integrating inspection environment 140 with container scanning tools or Kubernetes policy engines applied to the software container.

In some embodiments, responsive to detecting a cybersecurity issue, the inspection environment 140 identifies the release record associated with the software container. The inspection environment 140 compares the fingerprint of the release record against the plurality of source code fingerprints generated from the chart source objects in the source repository 130. Responsive to determining that the fingerprint for the source code object matches the fingerprint for the release record, the inspection environment 140 associates the software container with the corresponding source code object.

In some embodiments, the inspection environment 140 is configured to initiate a remediation action on the matched source code object.

In some embodiments, the chart file is updated based on the first source code object. For example, responsive to detecting that a container image tag "nginx: 1.19" is vulnerable in the software container, the system generates an automated pull request to update the chart template in the chart file to reference nginx: 1.25. In another example, if an unauthorized port 8080 is detected, the system modifies the Service template in the chart source files to remove the exposed port. In some embodiments, remediation further includes initiating an automated redeployment of the Helm release with the corrected chart source files. In some embodiments, updating the chart file is based on a pull request to the source repository.

In some embodiments, mitigation and remediation actions triggered by fingerprint mismatches or cybersecurity issues are logged in the central metadata repository (e.g., metadata repository 144). The logs include fingerprints for the release records (e.g., abcd1234), the plurality of source code fingerprints (e.g., efgh5678), mismatch classifications (version drift, config drift, cybersecurity issue), detected issues (e.g., CVE-2023-12345), and the action taken (e.g., rolled back release, applied patch, opened PR).

In some embodiments, compliance reports, security audits, regression testing, a combination thereof and the like, are stored in the central metadata repository to ensure that policy enforcement remains consistent across chart versions and tenant environments.

For example, a regression test baseline includes a table of chart fingerprints and their expected remediation outcomes (e.g., values.yaml drift→auto-patch, vulnerable image→PR created).

In some embodiments, the inspection environment 140 is configured to initiate mitigation and remediation actions responsive to fingerprint mismatches detected between the fingerprint of the release record and the plurality of source code fingerprints.

In some embodiments, the remediation action is responsive to a fingerprint mismatch detected prior to deploying or instantiating the chart file in a tenant environment. For example, the inspection environment 140 prevents the deployment of a Helm chart in the tenant environment 150. For example, an admission controller is configured to deny the creation of Helm resources unless the fingerprint of the release record matches a source code fingerprint. For example, if the runtime fingerprint abcd1234 is absent from source repository 130, the admission webhook returns an error and blocks release.

In some embodiments, the system denies upgrades, rollbacks, a combination thereof and the like, where the fingerprint for the release record corresponds to an outdated, drifted, a combination thereof and the like, versions. For example, a request to upgrade to "myapp: 1.2.2" is denied because the source code fingerprint indicates "1.2.5" is the latest supported version.

In some embodiments, mitigation further includes quarantining resources based on the chart file based on the matching to the first source code object. For example, quarantining resources based on the chart file whose fingerprints cannot be matched to any known source code fingerprint. Quarantining includes labeling such resources with quarantine=true, isolating them in a restricted namespace, terminating pods associated with unverified fingerprints, a combination thereof and the like.

In some embodiments, mitigation further includes preventing deployment of the chart file based on the match to the first source code object. For example, a chart file with a fingerprint that is mismatched or based on heuristic matching may be prevented from deploying or instantiating in the tenant environment, a user of the tenant environment asking to verify before deployment, a combination thereof and the like.

In some embodiments, responsive to a fingerprint mismatch after deployment, the inspection environment 140 initiates corrective updates. For example, if a values.yaml in the fingerprint for the release record is abcd1234 while the source code fingerprint is efgh5678, the fingerprint is classified as a mismatch and the system applies a patch to restore alignment with a repository configuration.

In some embodiments, remediation includes rolling back a release to a fingerprint-matched prior state of the first source code object. For example, if a fingerprinted release "payments-api: 1.5.2" is detected as drifted, the system issues a helm rollback to restore to the fingerprint-matched "1.5.1" release.

In some embodiments, remediation includes generating a patch or pull request in the source repository 130 to reconcile chart source files with validated runtime fingerprints. For example, the system generates a GitHub pull request that updates values.yaml in the branch main so that the repository reflects the secure configuration fingerprint.

In some embodiments, remediation includes annotating deployed resources with matched fingerprint identifiers to ensure subsequent traceability. For example, a Deployment resource is annotated with fingerprint.match=abcd1234 to link the resource to the source code fingerprint.

In some embodiments, the method and system described herein are performed before and after deployment. For example, evaluating a first chart file before deployment in a software container and evaluating a second chart file after deployment in the software container.

Figure 2:
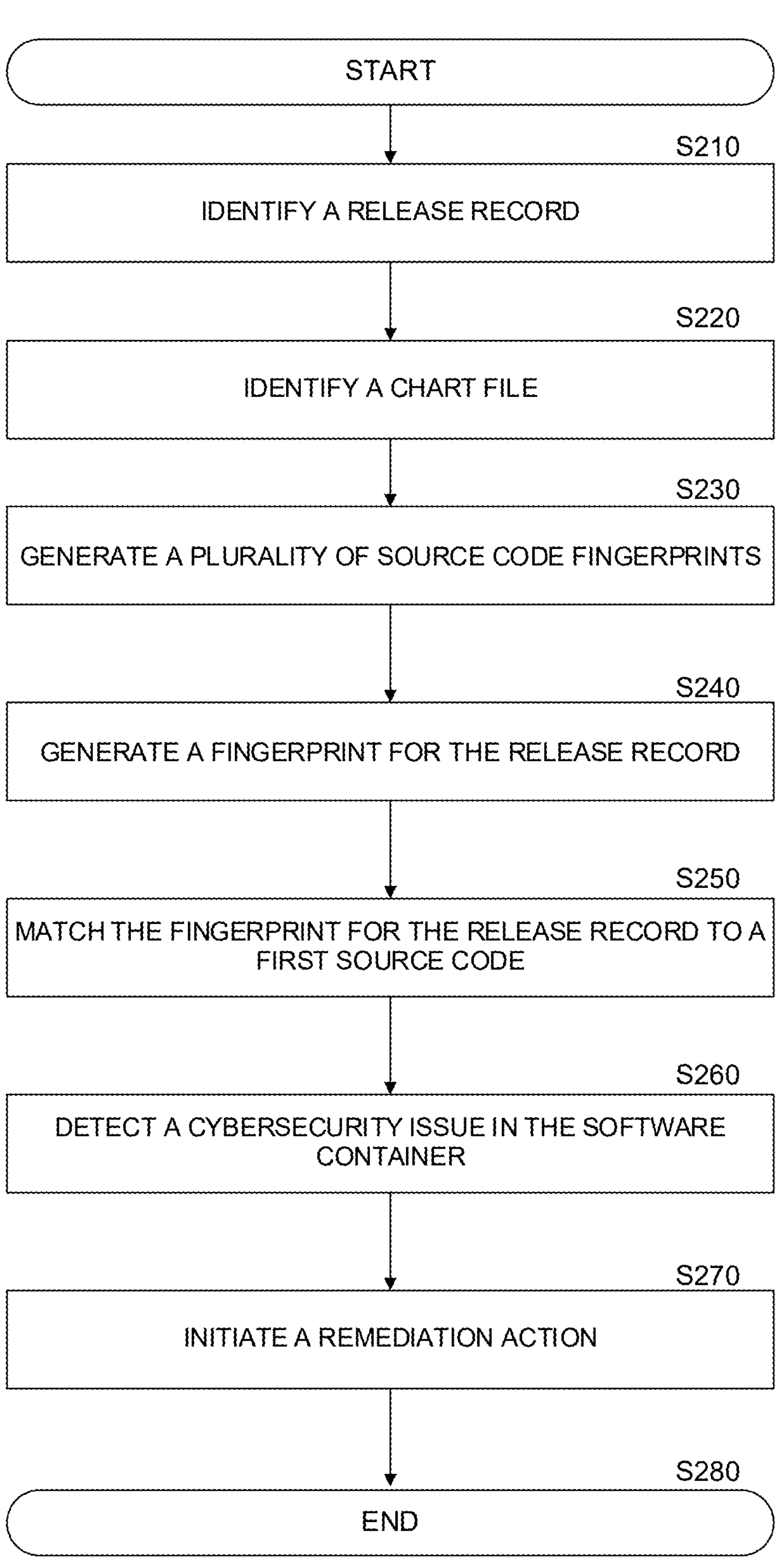
FIG. 2 illustrates an example method for correlating deployed release records to source code fingerprints and performing remediation actions, according to some embodiments of the present disclosure.

FIG. 2 illustrates an example method for correlating deployed release records to source code fingerprints and performing remediation actions, according to some embodiments of the present disclosure.

At step S210, a release record is identified. In some embodiments, the release record is identified within a tenant or containerized environment as an artifact generated during deployment of a chart file. The release record includes chart metadata and configuration parameters describing a deployed instance of an application in a software container. In some embodiments, the release record is a deployment secret, configuration map, or other persisted runtime object generated by a deployment management platform, such as Helm, during installation, upgrade, or rollback of a chart release. In some embodiments, the release record is identified based on a query via an application programming interface (API) to identify release records matching one or more naming conventions or labels indicative of chart ownership (e.g., owner=helm, app.kubernetes.io/managed-by=Helm).

For example, a deployment secret named sh.helm.release.v1.payments. 1 generated during installation of a chart file corresponds to a payments application. The deployment secret includes encoded chart metadata such as chart name "payments-api," chart version "1.5.2," release name "payments," and a base64-encoded payload of rendered Kubernetes manifests and configuration parameters. The payload is decoded to identify the release record.

At S220, a chart file is identified. In some embodiments, the chart file is identified based on the release record, the chart file includes metadata and configuration parameters for deploying an application in a software container. In some embodiments, the chart file is identified based on identifiers such as a chart name and version from the release record. In some embodiments, the chart file is identified based on a query to a source repository. For example, the release record is detected through Helm-generated deployment secrets or configmaps, and the chart file is identified in the source repository based on the release record.

For example, the release record includes a chart name and version, as well as rendered configuration data derived from corresponding chart files. A chart file is retrieved from the source repository, via an application programming interface (API) call, based on a Chart.yaml specifying chart name 'payments-api' and version '1.5.2,' a values.yaml defining replica count and container image reference, a combination thereof and the like.

At S230, a plurality of source code fingerprints is generated. In some embodiments, each source code fingerprint in the plurality of source code fingerprints is generated based on metadata of a source code object. The metadata of a source code object includes version control metadata, chart source metadata, a combination thereof and the like. For example, according to an embodiment, the source code object includes chart source files such as templates and values files, as well as version control metadata such as commit identifiers, tags, and branches, each of which are hashed or encoded to form a source code fingerprint.

For example, the fingerprint generated by applying a hash function such as SHA-256 to the contents of a Chart.yaml, the rendered templates, or to the commit object for tag "v1.5.2," thereby producing multiple source code fingerprints corresponding to different repository states.

At S240, a fingerprint for the release record is generated. In some embodiments, the fingerprint for the release record is based on at least the metadata and configuration parameters. For example, the fingerprint is generated based on chart metadata stored in a deployment secret (such as a Kubernetes Secret), runtime artifacts, a combination thereof and the like, and includes a checksum of the chart version, values file, or rendered templates to uniquely represent the release record.

For example, the inspector queries the deployment secret such as sh.helm.release.v1.payments.1, decodes the payload, and computes a SHA-256 fingerprint over the values file and deployment template, producing a fingerprint string representative of the deployed chart.

At S250, the fingerprint for the release record is matched to a first source code fingerprint. In some embodiments, the first source code fingerprint is from the plurality of source code fingerprints corresponding to a first source code object. In some embodiments, the matching is based on comparing hash values, semantic version alignment, heuristic correlation, a combination thereof and the like, to associate the fingerprint for the release record from the tenant environment with the corresponding source code object from the repository.

For example, responsive to chart metadata indicating chart "payments-api" version "1.5.2," the inspection environment queries the source repository for tag "v1.5.2," locates the commit, and determines that the fingerprint for the release record matches the fingerprint computed from that commit.

At S260, a cybersecurity issue in the software container is detected. In some embodiments, the issue is identified by a container security scanner or policy engine, which analyzes the software container associated with the chart file and determines that the container image or configuration violates security or compliance requirements.

For example, the scanner detects that the deployed container image includes a vulnerable library (e.g., OpenSSL with CVE-2023-XXXX), or that the container omits required encryption or network policy configurations.

At S270, a remediation action is initiated. In some embodiments, initiating a remediation action is based on the cybersecurity issue on the first source code object, in response to determining that the fingerprint of the first source code object matched the fingerprint for the release record. The remediation action includes generating a patch, rolling back to a prior version, quarantining the affected container, creating a pull request to update the source chart, a combination thereof and the like.

For example, responsive to detecting a vulnerable container image, the inspection environment generates a pull request modifying values.yaml to reference a safe version, initiates a Helm rollback command to restore the deployment to a prior version, logging the action for compliance reporting, a combination thereof and the like.

In some embodiments, the matched fingerprint for the release record to the first source code object is stored in a central repository. In some embodiments, the matched fingerprint includes matches based on heuristic matching, mismatches, a combination thereof and the like. The matched fingerprint is stored in a plurality of matched fingerprints. In some embodiments, compliance validation is performed based on the plurality of matched fingerprints. For example, comparing the most recent fingerprint in the plurality of matched fingerprints against previously stored fingerprints in the plurality of matched fingers to confirm that prior matches remain valid following updates to the chart source files or deployment configurations.

Figure 3:
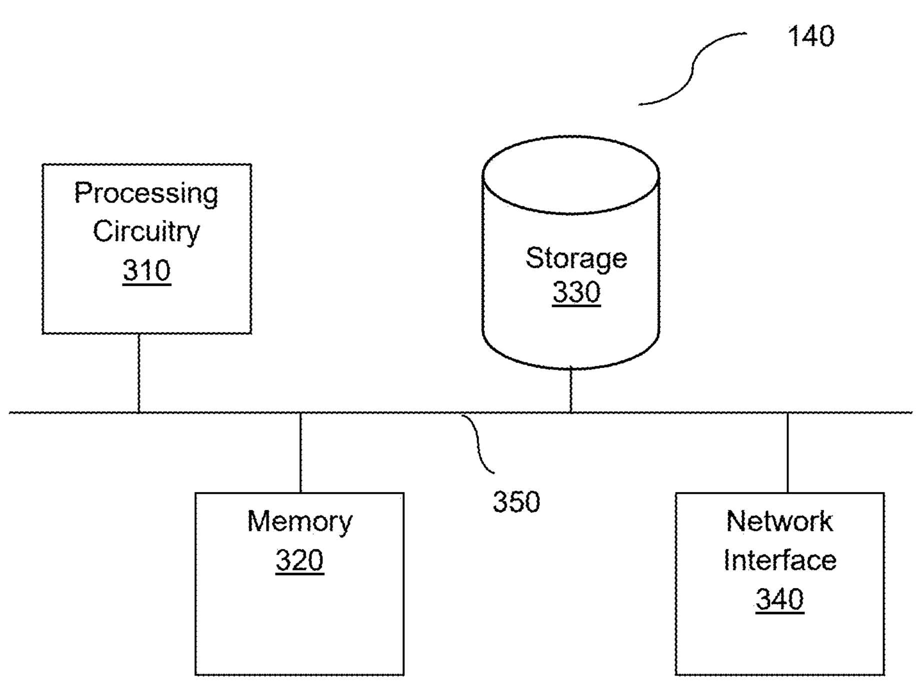
FIG. 3 is an example schematic diagram of an inspection environment according to an embodiment.

FIG. 3 is an example schematic diagram of an inspection environment 140 according to an embodiment. The inspection environment 140 includes a processing circuitry 310 coupled to a memory 320, a storage 330, and a network interface 340. In an embodiment, the components of the inspection environment 140 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., random access memory, etc.), non-volatile (e.g., read-only memory, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 340 allows the inspection environment 140 to communicate with other systems, devices, components, applications, or other hardware or software components, for example, as described herein.

It should be understood that the embodiments described herein are not limited to the specific architecture illustrated in FIG. 3, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for remediating software container cybersecurity issues at a source, comprising:

identifying a release record generated from a deployment platform;

identifying a chart file based on the release record, the chart file including metadata and configuration parameters for deploying an application in a software container;

generating a plurality of source code fingerprints, each source code fingerprint generated based on metadata of a source code object;

generating a fingerprint for the release record based on at least the metadata and the configuration parameters;

matching the fingerprint for the release record to a first source code fingerprint from the plurality of source code fingerprints corresponding to a first source code object;

detecting a cybersecurity issue in the software container; and initiating a remediation action based on the cybersecurity issue on the first source code object in response to determining that the fingerprint of the first source code object matches the fingerprint for the release record, the remediation action comprising:

identifying a source repository based on the first source code object;

generating a pull request in the identified source repository to update the chart file corresponding to the first source code object; and updating the chart file based on the pull request.

2. The method of claim 1, further comprising:

verifying a checksum of the chart file against a checksum in the release record.

3. The method of claim 1, wherein the metadata includes chart source metadata and version control metadata.

4. The method of claim 1, further comprising:

hashing the metadata and configuration parameters.

5. The method of claim 1, further comprising:

applying heuristic fingerprint matching based on the matched fingerprint for the release record to the first source code fingerprint, where the heuristic fingerprint matching is at least one of: nearest semantic version, commit timestamp proximity or checksum similarity.

6. The method of claim 1, further comprising:

updating the chart file based on the first source code object.

7. The method of claim 1, further comprising:

storing the matched fingerprint for the release record to the first source code object in a central repository, where the central repository stores the matched fingerprint with a plurality of matched fingerprints; and performing compliance validation based on the plurality of matched fingerprints.

8. The method of claim 1, further comprising:

detecting configuration drift based on the matched fingerprint for the release record to the first source code fingerprint.

9. The method of claim 1, further comprising:

detecting a second chart file, the second chart file including metadata and configuration parameters for a deployed application in a software container.

10. A non-transitory computer-readable medium storing a set of instructions for remediating software container cybersecurity issues at a source, the set of instructions comprising:

one or more instructions that, when executed by one or more processing circuitries of a device, cause the device to:

identify a release record generated from a deployment platform identify a chart file based on the release record, the chart file including metadata and configuration parameters for deploying an application in a software container generate a plurality of source code fingerprints, each source code fingerprint generated based on metadata of a source code object generate a fingerprint for the release record based on at least the metadata and the configuration parameters match the fingerprint for the release record to a first source code fingerprint from the plurality of source code fingerprints corresponding to a first source code object detect a cybersecurity issue in the software container; and initiate a remediation action based on the cybersecurity issue on the first source code object in response to determining that the fingerprint of the first source code object matches the fingerprint for the release record, the remediation action comprising:

identifying a source repository based on the first source code object;

generating a pull request in the identified source repository to update the chart file corresponding to the first source code object; and updating the chart file based on the pull request.

11. A system for remediating software container cybersecurity issues at a source comprising:

a processing circuitry;

a memory, the memory containing instructions that, when executed by the processing circuitry, configure the system to:

identify a release record generated from a deployment platform identify a chart file based on the release record, the chart file including metadata and configuration parameters for deploying an application in a software container generate a plurality of source code fingerprints, each source code fingerprint generated based on metadata of a source code object generate a fingerprint for the release record based on at least the metadata and the configuration parameters match the fingerprint for the release record to a first source code fingerprint from the plurality of source code fingerprints corresponding to a first source code object detect a cybersecurity issue in the software container; and initiate a remediation action based on the cybersecurity issue on the first source code object in response to determining that the fingerprint of the first source code object matches the fingerprint for the release record, the remediation action comprising:

identifying a source repository based on the first source code object;

generating a pull request in the identified source repository to update the chart file corresponding to the first source code object; and updating the chart file based on the pull request.

12. The system of claim 11, wherein the memory contains further instructions which when executed by the processing circuitry further configure the system to:

verify a checksum of the chart file against a checksum in the release record.

13. The system of claim 11, wherein the metadata includes chart source metadata and version control metadata.

14. The system of claim 11, wherein the memory contains further instructions which when executed by the processing circuitry further configure the system to:

hash the metadata and configuration parameters.

15. The system of claim 11, wherein the memory contains further instructions which when executed by the processing circuitry further configure the system to:

apply heuristic fingerprint matching based on the matched fingerprint for the release record to the first source code fingerprint, where the heuristic fingerprint matching is at least one of:

nearest semantic version, commit timestamp proximity or checksum similarity.

16. The system of claim 11, wherein the memory contains further instructions which when executed by the processing circuitry further configure the system to:

update the chart file based on the first source code object.

17. The system of claim 11, wherein the memory contains further instructions which when executed by the processing circuitry further configure the system to:

store the matched fingerprint for the release record to the first source code object in a central repository, where the central repository stores the matched fingerprint with a plurality of matched fingerprints; and perform compliance validation based on the plurality of matched fingerprints.

18. The system of claim 11, wherein the memory contains further instructions which when executed by the processing circuitry further configure the system to:

detect configuration drift based on the matched fingerprint for the release record to the first source code fingerprint.

19. The system of claim 11, wherein the memory contains further instructions which when executed by the processing circuitry further configure the system to:

detect a second chart file, the second chart file including metadata and configuration parameters for a deployed application in a software container.

* * * * *